United States Patent Office 3,524,836
Patented Aug. 18, 1970

---

3,524,836
VULCANIZATION OF FLUORINATED POLYMERS AND COMPOSITIONS THEREFOR
Arthur Livingston Barney and Wolfgang Honsberg, Wilmington, Del., assignors to E. I. du Pont de Nemours and Company, Wilmington, Del., a corporation of Delaware
No Drawing. Continuation-in-part of application Ser. No. 661,230, Aug. 17, 1967. This application June 20, 1968, Ser. No. 738,426
Int. Cl. C08f *15/06, 27/00, 29/16*
U.S. Cl. 260—80.77    11 Claims

---

ABSTRACT OF THE DISCLOSURE

The acceleration of the vulcanization of saturated, fluorinated polymers by the use of open-chain polyethers. The accelerators enable a satisfactory rate and state of cure with polyhydroxy aromatic nucleophiles in a weakly basic system, otherwise incapable of adequately curing fluorinated polymers. The accelerators are of the formula

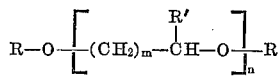

wherein R is hydrogen or $C_1$ to $C_4$ alkyl, $m$ is from 1–3, R' is hydrogen or methyl and $n$ is an integer sufficient to give a molecular weight of at least about 150.

---

CROSS-REFERENCE TO OTHER APPLICATION

This application is a continuation-in-part of applicants' copending application Ser. No. 661,230, filed Aug. 17, 1967, and now abandoned.

BACKGROUND OF THE INVENTION

Field of the invention

This invention relates to the vulcanization of fluorinated polymers and to vulcanizable compositions containing such polymers.

Description of the prior art

The vulcanization of saturated, fluorinated elastomeric polymers is well known. A wide variety of amine-based vulcanization systems have been developed. It is frequently desirable, however, to accomplish the state of cure desired in a shorter time. Moreover, it is sometimes desirable to be able to use as curing agents certain compounds presently somewhat unsatisfactory for that purpose either form a time-delay standpoint or from the ultimate state of cure obtainable therewith.

SUMMARY OF THE INVENTION

The vulcanization of saturated, fluorinated elastomeric polymers with a polyhydroxy aromatic nucleophile in a weakly basic system in the presence of about 0.1 to 20 parts of an accelerator, per 100 parts of polymer, of the formula

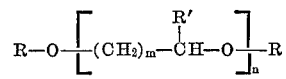

wherein R is hydrogen or $C_1$ to $C_4$ alkyl, $m$ is from 1 to 3, R' is hydrogen or methyl, and $n$ is an integer sufficient to give a molecular weight of at least about 150.

DETAILED DESCRIPTION OF THE INVENTION

This invention is applicable to saturated interpolymers of vinylidene fluoride ($VF_2$) with other fluorine-containing ethylenically unsaturated monomers copolymerizable therewith. Typical of the latter are hexafluoropropene (HFP), tetrafluoroethylene (TFE), perfluoroalkyl perfluorovinyl ethers [particularly where the alkyl radical contains from 1 to about 4 carbon atoms such as perfluoro(methyl vinyl ether) and perfluoro (propyl vinyl ether)], trifluorochloroethylene, and pentafluoropropylene. Of particular interest are the vinylidene fluoride/hexafluoropropene copolymers containing from about 70 to about 30 weight percent vinylidene fluoride and about 30 to about 70 weight percent hexafluoropropene (see Rexford, U.S. Pat. 3,051,677). Other important polymers are the terpolymers of vinylidene fluoride/hexafluoropropene/tetrafluoroethylene wherein the monomer units are present in the following mole ratios: about 3 to 35 (preferably 15 to 25) weight percent tetrafluoroethylene units and about 97 to 65 (preferably 85 to 75) weight percent vinylidene fluoride and hexafluoropropene units, the latter two being present in a weight ratio of from about 2.5:1 to 0.5:1 (see Pailthorp & Schroeder, U.S. Pat. 2,968,649).

Other vinylidene fluoride polymers and their preparation are disclosed in Dittman et al., U.S. Pats. 2,738,343 and 2,752,331; Hanford & Roland, U.S. Pat. 2,468,664; Brubaker, U.S. Pat. 2,393,967; and Honn et al., U.S. Pats. 2,833,752 and 2,965,619.

Open-chain polyethers of the formula

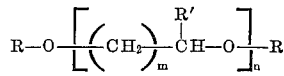

are used as accelerators in this invention. R can be hydrogen or lower alkyl, preferably ethyl, and R' is hydrogen or methyl. The subscript $m$ can be from 1 to 3 and $n$ can be an integer sufficient to give a molecular weight of at least about 150. The upper limit on molecular weight is not particularly critical; however, it will not usually exceed about 10,000. Representative of such ethers are bis[2-(2-methoxyethoxy)ethyl]ether, wherein $m$ is 1, $n$ is 4, R' is hydrogen, and R is methyl; diethyleneglycol diethylether wherein $m$ is 1, $n$ is 2, R is ethyl, and R' is hydrogen; and polypropyleneglycol (M.W. 400), wherein $m$ is 1, R is hydrogen, R' is methyl, and $n$ is about 7. Other ethers of this type are polytetramethylene ether glycol (M.W. 1000), wherein R and R' are hydrogen, $m$ is 3 and $n$ is sufficient to give a molecular weight of about 1000, monomethoxy polyethylene ether glycol of a molecular weight of about 350 and a formula $CH_3$—O$(CH_2$—$CH_2$—O$)_n$H ("Carbowax 350"), a polyethylene ether glycol of molecular weight of about 400 and a formula HO$(CH_2$—$CH_2$—O$)_n$H ("Carbowax 400"), and 1,2-bis (2-methoxyethoxy)ethane. The preparation of such ethers is well known to those skilled in the art.

The accelerators of this invention enable the rapid and satisfactory vulcanization of saturated, fluorinated polymers by using poly(nucleophiles) in a basic system. Representative poly(nucleophiles) such as dihydroxy and trihydroxy aromatic compounds, such as 2,2-bis(4-hydroxyphenyl)propane (bisphenol-A), 2,2-bis(4 - hydroxyphenyl)perfluoropropane (bisphenol AF), resorcinol, 1,3,5-trihydroxybenzene, 1,7-dihydroxynaphthalene, 2,7 - dihydroxynaphthalene, 1,6 - dihydroxynaphthalene, 4,4' - dihydroxydiphenyl, 4,4'-dihydroxystilbene 2,6-dihydroxyanthracene, hydroquinone, catechol, 2,2-bis(4-hydroxyphenyl)-butane (bisphenol B), 4,4-bis(4 - hydroxyphenyl)pentanoic acid, 2,2 - bis(4-hydroxyphenyl) - tetrafluorodichloropropane, 4,4' - dihydroxydiphenyl sulfone, 4,4' - dihydroxydiphenyl ketone, tri(4 - hydroxyphenyl) methane, 3,3',5,5'-tetrachlorobisphenol A, 3,3',5,5'-tetrabromobisphenol A, or their alkali or alkaline earth metal salts.

The amounts of poly(nucleophile) may range from about 0.1 to 20 parts per 100 parts of fluoroelastomer but amounts from about 0.5 to 3 parts may be preferred, depending on the particular compound. Poly(nucleophiles) which are sterically hindered are usually less satisfactory and it is possible that a very hindered compound might not even be usable in a practical sense.

The creation of a weakly basic system should not include amines and can be effected in a number of ways familiar to those skilled in the art. One way is to use the alkali or alkaline earth metal salts (preferably the monometallic salts) of the poly(nucleophiles) mentioned above. Another way is to employ 0.1 to 20 equivalents (preferably 0.2 to 0.7 equivalent) of an alkali or alkaline earth metal salt of a weak acid per equivalent of —OH group in the poly(nucleophile). Weak acids are those with ionization constants from about $10^{-4}$ to $10^{-10}$ and many are known to those skilled in the art.

The accelerators of this invention are normally used in the presence of basic divalent metal oxides such as MgO, CaO, ZnO, PbO, BaO and basic metal hydroxides such as $Mg(OH)_2$, $Ca(OH)_2$ and $Ba(OH)_2$. MgO is greatly preferred and $Mg(OH)_2$ may be used as a substitute therefor. Amounts ranging from 1 to 20 parts (preferably 2 to 15 parts) per 100 parts of elastomer may be suitable.

The accelerator compounds of this invention enable the use of various materials as curing agents which could not be satisfactorily employed alone. It has been found that the accelerator compounds of this invention do not by themselves effect curing even when as much as 5 parts are used.

The invention will now be described in relation to examples of specific embodiments thereof wherein parts and percentages are by weight unless otherwise specified.

EXAMPLE 1

This example illustrates the curing of a copolymer of $VF_2$, TFE and HFP in the following respective weight percentages: 45, 30 and 25 (prepared according to Pailthorp et al., U.S. 2,968,649) with either the dipotassium salt of bisphenol AF or a mixture of the dipotassium salt with bisphenol AF.

On a cold rubber mill, the copolymer is compounded with carbon black, magnesium oxide ("Maglite D"), monomethoxy polyethylene ether glycol of M.W. about 350 ("Carbowax 350"), and the dipotassium salt of bisphenol AF, as shown in the table. A 3-inch x 6-inch x 0.75-inch slab and small pellets are cured in a press for 30 minutes at 165° C., and postcured in an oven for 24 hours at 204° C. The resultant elastomers are strong and well cured as shown by the good tensile properties, measured at 25° C., and good compression set, measured at 25° C.

| Ingredients | Parts | |
| --- | --- | --- |
|  | 1-A | 1-B |
| Copolymer | 100 | 100 |
| Thermax MT carbon black | 20 | 20 |
| MgO | 10 | 10 |
| Accelerator | 2 | 4 |
| Dipotassium bisphenol AF | 2 | 1 |
| Bisphenol AF |  | 0.83 |
| Test data: |  |  |
| Modulus, 100% elong | 700 | 600 |
| Tensile strength, p.s.i | 2,300 | 2,100 |
| Percent elong. at break | 205 | 210 |
| Shore hardness | 71 | 68 |
| Compression set, 70 hr., 25° C | 24 | 22 |
| Compression set, 70 hr., 204° C | 50 | 49 |

EXAMPLE 2

This example illustrates the curing of the copolymer of Example 1 with the monosodium salt of bisphenol AF. On a cold rubber mill, 120 parts of copolymer, 24 parts of MT carbon black, 12 parts of MgO ("Maglite D"), 2.4 parts of the accelerator of Example 1, and 2.4 parts of the monosodium salt of bisphenol AF are compounded. As before, test samples are cured 30 minutes at 165° C., and postcured 24 hours at 204° C. in an oven. The tensile strength (at room temperature) is 1700 p.s.i., and the percent elongation at break is 140. The compression set values are 23, 24, and 47 tested 70 hours at 25° C., 121° C., and 204° C., respectively.

The monosodium salt of bisphenol AF is prepared by stirring, until dissolved, 4 g. sodium hydroxide (0.10 mole), 200 ml. methanol, and 33.6 g. bisphenol AF (0.10 mole). The mixture is heated 5 minutes at reflux, and then evaporated to dryness in a spinning flask, finishing 1 hour at 100° C. under 1 mm. pressure. The yield is 37.1 g. of a white powder which was ground fine using a mortar and pestle.

EXAMPLE 3

This example illustrates the curing of a copolymer of 60% $VF_2$ and 40% HFP (prepared according to Rexford, U.S. Pat. 3,051,677) and the copolymer of Example 1 with various samples of a potassium salt of bisphenol AF, but using as accelerator either a polyethylene ether glycol of M.W. about 400 ("Carbowax 400") or 1,2-bis(2-methoxyethoxy)ethane.

As before, the copolymer is compounded as shown in the table and test specimens are cured by the method of Example 1.

The potassium salt of bisphenol AF, 65% basic, is prepared by stirring until soluble 43 g. of potassium hydroxide pellets (85+ percent purity, 0.65 mole), 300 ml. methanol, and 168 g. of bisphenol AF (0.50 mole). The solution is evaporated in a spinning flask, finishing at 40° C. under 5 mm. pressure. The solid product is ground, and dried again at 40° C. under 5 mm. pressure. The yield is 167 g. of a white powder, which was ground as a fine powder before use.

The potassium salt of bisphenol AF, 35% basic, is prepared in a similar fashion from 13.2 g. of potassium hydroxide pellets (0.20 mole), 200 ml. methanol, and 96 g. of bisphenol AF (0.286 mole). The yield is 108 g. of a white powder.

| Ingredients | Parts | |
| --- | --- | --- |
|  | 3-A | 3-B |
| $VF_2$/HFP copolymer | 100 |  |
| Copolymer of Example 1 |  | 100 |
| MT carbon black | 30 | 30 |
| MgO | 4 | 4 |
| Polyethylene ether glycol (M.W. 400) | 2 |  |
| Potassium salt of bisphenol AF, 65% basic | 1.5 | 2.5 |
| Potassium salt of bisphenol AF, 35% basic | 1 |  |
| 1,2-bis(2-methoxyethoxy)ethane |  | 2 |
| Test Data (at 25° C.): |  |  |
| Modulus, 100% elong | 520 | 400 |
| Tensile strength, p.s.i | 1,350 | 1,950 |
| Percent elongation at break | 220 | 285 |
| Shore hardness | 70 | 70 |
| Compression set, 70 hr., 25° C | 17 | 25 |
| Compression set, 70 hr., 121° C | 10 | 26 |
| Compression set, 70 hr., 204° C | 41 | 49 |

EXAMPLE 4

This example illustrates the effect of various fillers and shows that magnesium hydroxide may be employed instead of magnesium oxide. Also this example illustrates that useful vulcanizate properties may be obtained without postcuring with some of these new curing recipes.

The $VF_2$/HFP copolymer of Example 3 is compounded on a cold rubber mill, as shown in the table. Properties are shown in the table, both after press cure (with no postcure), and with the usual 24 hours at 204° C. postcure.

The sample of monopotassium salt of bisphenol AF, 50% basic, is made by the method of Example 3, but using 33 g. of potassium hydroxide (0.50 mole), 308 ml. methanol, and 168 g. of bisphenol AF (0.50 mole).

| Ingredients | Parts | | | | | |
|---|---|---|---|---|---|---|
| | 4-A | 4-B | 4-C | 4-D | 4-E | 4-F |
| Copolymer | 100 | 100 | 100 | 100 | 100 | 100 |
| MT carbon black | 30 | 30 | 30 | 30 | 30 | 30 |
| MgO | | 4 | 4 | 4 | 4 | 4 |
| Magnesium hydroxide | 4 | | | | | |
| Accelerator of Example 1 | 2 | 2 | 2 | 2 | 2 | 2 |
| Monopotassium bisphenol AF | 2.5 | 2.5 | 2.5 | 2.5 | 2.5 | 2.5 |
| Zinc oxide | | | 5 | | | |
| Calcium oxide | | | | 5 | | |
| Barium carbonate | | | | | 5 | |
| Magnesium fluoride | | | | | | 5 |
| Mooney scorch at 250° F.: | | | | | | |
| Minimum | 24 | 28 | 31 | 32 | 27 | 28 |
| Minutes 10 points rise | >45 | 30 | 32 | 23 | 30 | 36 |
| After press cure:[1] | | | | | | |
| Shore hardness | 66 | 64 | 63 | 63 | 64 | 69 |
| Comp. set, 70 hr. 204° C | 84 | 63 | 100 | 100+ | 100+ | 65 |
| After press cure:[2] | | | | | | |
| Modulus, 100% elong | 510 | 400 | 400 | 800 | 680 | 810 |
| Tensile strength, p.s.i | 1,850 | 1,600 | 1,750 | 1,700 | 1,700 | 1,900 |
| Percent elong. at break | 240 | 280 | 310 | 180 | 180 | 180 |
| Shore hardness | 69 | 66 | 64 | 74 | 71 | 72 |
| Compression set: | | | | | | |
| 70 hr., 25° C | 11 | 12 | 18 | 10 | 8 | 10 |
| 70 hr., 121° C | 10 | 5 | 10 | 10 | 8 | 8 |
| 70 hr., 204° C | 33 | 32 | 59 | 52 | 37 | 32 |

[1] 30 min. at 165° C. and no postcure.
[2] 30 min. at 165° C., and oven postcure 24 hours at 204° C. (tested at 25° C.).

EXAMPLE 5

This example illustrates how the elastomer can be cured satisfactorily in a press without a postcure, using the monopotassium salt of bisphenol AF and the accelerator of Example 1.

| Ingredients | Parts | | |
|---|---|---|---|
| | 5-A | 5-B | 5-C[1] |
| Copolymer | 100 | 100 | 100 |
| Thermax MT black | 20 | 30 | 20 |
| MgO | 10 | 4 | |
| Accelerator | 2 | 2 | |
| Monopotassium bisphenol AF | 2.5 | 2.5 | |
| MgF₂ | | 5 | |
| MgO ("Maglite Y") | | | 15 |
| Cinnamylidene hexamethylene diamine | | | 3 |
| Mooney scorch at 250° F. | | | |
| Minimum | 86 | 56 | |
| Minutes 10 points rise | 3 | 21 | |
| After press cure, 30 mins., 165° C.: | | | |
| Shore hardness | 67 | 71 | |
| Modulus, 100% elong | 420 | 550 | |
| Tensile strength, p.s.i | 1,500 | 1,500 | |
| Percent elong. at break | 315 | 310 | |
| Comp. set, 70 hrs., 25° C | 15 | 16 | |
| Comp. set, 70 hrs., 121° C | 45 | 48 | |
| Comp. set, 70 hrs., 204° C | 66 | 60 | |
| After press cure:[2] | | | |
| Modulus, 100% elong | 630 | 950 | 550 |
| Tensile strenght, p.s.i | 2,500 | 2,450 | 2,500 |
| Percent elong. at break | 260 | 210 | 270 |
| Percent vol. swell, acetone, 1 day | 294 | 230 | 302 |
| Shore hardness | 72 | 74 | 71 |
| Comp. set, 70 hrs., 25° C | 12 | 12 | 22 |
| Comp. set, 70 hrs., 121° C | | | |
| Comp. set, 70 hrs., 204° C | 32 | 26 | 66 |

[1] Outside the invention—for comparison only.
[2] 30 mins. 165° C., and oven postcure with 4 hours to 204° C., 24 hours at 204° C.

The copolymer of Example 1 is compounded on a cold rubber mill. Properties are shown in the table, both after press cure (with no postcure), and the usual 24 hours at 204° C. postcure. The properties without any postcure using the monopotassium salt of bisphenol AF are almost as good as those of the copolymer cured with cinnamylidene hexamethylene diamine, using a postcure, as shown in the preceding table.

EXAMPLE 6

This example illustrates the curing of the elastomer using the dipotassium salt of tetrabromobisphenol A in conjunction with hydroquinone or tetrabromobisphenol A.

The copolymer of Example 1 is compounded on a cold rubber mill. Properties are shown in the table. Better results are obtained using hydroquinone as the curing agent instead of tetrabromobisphenol A, probably because stearic hindrance in the latter case retards the addition of the phenolic hydroxyl group to the double bond in the copolymer. However, even with tetrabromobisphenol A as curing agent, a usable, lightly cross-linked rubber is obtained.

The dipotassium salt of tetrabromobisphenol A is prepared from 13.2 g. of potassium hydroxide (0.20 mole), 200 ml. methanol, and 54.4 g. of tetrabromobisphenol A (0.10 mole). Evaporation in a spinning flask, finishing at 40° C. under 5 mm. pressure gives 60 g. of a white powder, which is ground fine before use.

| Ingredients | Parts | | | | |
|---|---|---|---|---|---|
| | 6-A | 6-B | 6-C | 6-D | 6-E |
| Copolymer | 100 | 100 | 100 | 100 | 100 |
| MT carbon black | 20 | 20 | 20 | 20 | 30 |
| MgO | 10 | 10 | 10 | 10 | 4 |
| Accelerator of Example 1 | 2 | 2 | 2 | 2 | 2 |
| Dipotassium salt of tetrabromo bisphenol A | 2 | 2 | 3 | 3 | 2.5 |
| Hydroquinone | 0.5 | 1 | 0.5 | 1 | |
| Tetrabromo bisphenol A | | | | | 1.5 |
| Mooney scorch at 250° F.: | | | | | |
| Minimum | 58 | 54 | 60 | 55 | |
| Minutes 10 points rise | 18 | 31 | 13 | 24 | |
| After press cure[1] | | | | | |
| Shore hardness | 70 | 71 | 72 | 73 | 73 |
| Modulus, 100% elong | 520 | 550 | 650 | 650 | 300 |
| Tensile strength, p.s.i | 2,200 | 2,000 | 1,700 | 1,800 | 1,400 |
| Percent elong. at break | 260 | 260 | 190 | 200 | 450 |
| Comp. set, 70 hr., 25° C | 18 | 12 | 16 | 11 | 42 |
| Comp. set, 70 hr., 204° C | 51 | 40 | 50 | 41 | 91 |
| Percent vol. swell, acetone, 1 week | 339 | 364 | 287 | 267 | 798 |

[1] 30 min. at 165° C., and oven postcure, 24 hours at 204° C.

EXAMPLE 7

This example illustrates the curing of the elastomer using the accelerator of Example 1, the monopotassium salt of bisphenol A and hydroquinone. The copolymer of Example 1 is compounded on a rubber mill, and vulcanizate properties are shown in the table. The samples are well cured in stocks 7–A, 7–B, and 7–C, where the ratio of potassium to phenolic hydroxyl groups is 0.5 to 0.27, but the elastomer is not cured in stock 7–D, where the ratio of potassium to phenolic hydroxyl groups is only 0.17.

The monopotassium salt of bisphenol A is prepared from 52.8 g. of potassium hydroxide (0.80 mole), 660 ml. methanol, and 176 g. of bisphenol A (0.77 mole), using the method of Example 3. The yield is 172 g. of a light tan free-flowing powder.

|  | Parts | | | |
|---|---|---|---|---|
| Ingredients | 7–A | 7–B | 7–C | 7–D |
| Copolymer | 100 | 100 | 100 | 100 |
| Thermax MT carbon black | 20 | 20 | 20 | 20 |
| MgO | 10 | 10 | 10 | 10 |
| Accelerator | 2 | 2 | 2 | 2 |
| Potassium salt of bisphenol A | 2 | 2 | 2 | 1 |
| Hydroquinone |  | .5 | .75 | .75 |
| Mooney scorch at 250° F. | | | | |
| Minimum | 53 | 84 | 45 | 33 |
| Minutes 10 points rise | 4 | 4 | 7 | 45 |
| After press cure:[1] | | | | |
| Shore hardness | 71 | 72 | 72 | ------ |
| Modulus, 100% elong | 360 | 700 | 830 | ------ |
| Tensile strength, p.s.i | 1,600 | 2,000 | 1,900 | ------ |
| Percent elong. at break | 310 | 200 | 170 | ------ |
| Comp. set, 70 hrs., 25° C | 32 | 12 | 8 | ------ |
| Comp. set, 70 hrs., 204° C | 65 | 36 | 30 | ------ |

[1] 30 min. 165° C. and oven postcure, 24 hours, 204° C.

EXAMPLE 8

This example illustrates the curing of the elastomer using the dipotassium salt of tetrachlorobisphenol A in conjunction with either hydroquinone or bisphenol A. The copolymer is compounded on a cold rubber mill, and vulcanizate properties are given in the table. All of the samples are well cured.

The dipotassium salt of tetrachlorobisphenol A is made by the method of Example 3 from 79.2 g. of potassium hydroxide (1.2 moles), 50 ml. of methanol, and 221 g. of tetrachlorobisphenol A (0.60 mole). The yield is 264 g., which was ground as a fine powder before use.

EXAMPLE 9

This example illustrates the curing of the elastomer using the potassium salt of 2,4,6-trichlorophenol in conjunction with hydroquinone. The copolymer is compounded as before and vulcanizate properties are given in the table.

The potassium salt of 2,4,6-trichlorophenol is prepared by the method of Example 3, but using 13.2 g. potassium hydroxide (0.20 mole), 39.6 g. 2,4,6-trichlorophenol (0.20 mole) and 150 ml. methanol. The yield is 43 g. of a white powder.

| Ingredients: | Parts 9–A |
|---|---|
| Copolymer of Example 1 | 100 |
| MT carbon black | 30 |
| MgO | 4 |
| Accelerator of Example 1 | 2 |
| Potassium 2,4,6-trichlorophenoxide | 3.5 |
| Hydroquinone | 0.75 |
| After pressure cure:[1] | |
| Shore hardness | 78 |
| Modulus, 100% elong. | 1100 |
| Tensile strength, p.s.i. | 2000 |
| Percent elong. at break | 165 |
| Comp. set, 70 hr. 25° C. | 25 |
| Comp. set, 70 hr. 121° C. | 18 |
| Comp. set, 70 hr. 204° C. | 71 |
| Percent Volume swell, acetone, 12 days | 227 |

[1] 30 min. 165° C., and oven postcure 24 hours at 204° C.

EXAMPLE 10

This example illustrates the curing of the elastomer, using potassium benzoate and hydroquinone, either with or without the accelerator of Example 1.

Stocks 10–A, 10–B, and 10–D, all of which contain 2–4 parts of accelerator, are cured fairly well after 30 minutes at 165° C. in a press, as judged by qualitative hand pull tests. After an oven postcure at 204° C., these three samples look fine, and are well cured as shown by compression set and volume swell data. However, Stock 10–C, containing no accelerator, is badly undercured after press curing. After an oven postcure at 204° C., the 10–C slab has many bubbles, and the state of cure is low as shown by the high percent volume swell in acetone.

|  | Parts | | | | |
|---|---|---|---|---|---|
| Ingredients | 8–A | 8–B | 8–C | 8–D | 8–E |
| Copolymer of Example 1 | 100 | 100 | 100 | 100 | 100 |
| MT carbon black | 30 | 30 | 30 | 30 | 30 |
| MgO | 4 | 4 | 4 | 4 | 4 |
| Accelerator of Example 1 | 2 | 2 | 2 | 2 | 2 |
| Dipotassium salt of tetrachlorobisphenol A | 2 | 3 | 2 | 3 | 3 |
| Hydroquinone | 0.75 | 0.75 | 0.75 | 0.75 | ------ |
| Bisphenol A |  |  |  |  | 1.5 |
| Magnesium fluoride |  |  | 5 | 5 | 5 |
| After press cure:[1] | | | | | |
| Shore hardness | 73 | 73 | 77 | 76 | 76 |
| Modulus, 100% elong | 680 | 750 | 850 | 1,000 | 630 |
| Tensile strength, p.s.i | 1,900 | 1,750 | 1,800 | 1,800 | 1,250 |
| Percent elong. at break | 215 | 210 | 190 | 180 | 230 |
| Comp. set, 70 hr. 25° C | 11 | 12 | 12 | 12 | 30 |
| Comp. set, 70 hr. 121° C | 11 | 12 | 11 | 12 | 30 |
| Comp set, 70 hr. 204° C | 34 | 40 | 32 | 35 | 55 |

[1] 30 min. 165° C. and oven postcure 24 hours at 204° C.

| Ingredients | Parts | | | |
|---|---|---|---|---|
| | 10-A | 10-B | 10-C[1] | 10-D |
| Copolymer of Example 1 | 100 | 100 | 100 | 100 |
| MT carbon black | 30 | 30 | 30 | 30 |
| MgO | 2 | 4 | 4 | 4 |
| Accelerator of Example 1 | 2 | 4 | 0 | 2 |
| Magnesium fluoride | 5 | 5 | 5 | |
| Hydroquinone | 0.75 | 0.75 | 0.75 | 0.75 |
| Potassium benzoate | 3 | 3 | 3 | 2.5 |
| After press cure:[2] | | | | |
| Shore hardness | 74 | 75 | | 75 |
| Modulus, 100% elong | 600 | 850 | 370 | 900 |
| Tensile strength, p.s.i | 1,650 | 1,400 | 570 | 1,750 |
| Percent elong. at break | 240 | 160 | 450 | 175 |
| Comp. set, 70 hr., 25° C | 42 | 37 | | 33 |
| Comp. set, 70 hr., 121° C | 37 | 31 | | 26 |
| Comp. set, 70 hr., 204° C | 82 | 96 | | 74 |
| Percent volume swell, acetone, 8 days | 283 | 246 | 586 | 249 |

[1] Outside the invention- for comparison only.
[2] 30 min. 165° C., and oven postcure 24 hours at 204° C.

EXAMPLES 11 TO 15

Examples 11 to 15 illustrate the curing of the elastomer using hydroquinone, the accelerator of Example 1, and various salts. In Example 11, potassium stearate is used; in Example 12, lithium benzoate; in Example 13, potassium hydrogen phthalate; in Example 14, potassium acetate; in Example 15, cesium benzoate. The copolymer is compounded on a cold rubber mill, and vulcanizate results are shown in the table.

Stock code 11 containing potassium stearate appears to be well cured as judged by hand pull tests after a press cure of 30 minutes at 165° C. After oven postcure, the elastomer is tightly cross-linked as shown by the low percent volume swell in acetone and tensile and compression set figures.

Stock code 12 containing lithium benzoate appears to be badly undercured after a press cure of 30 minutes at 165° C. After postcuring for 24 hours at 204° C., the elastomer is well cured as shown by percent volume swell in acetone and tensile figures.

Stock code 13 containing potassium acid phthalate is not cured after a press cure of 30 minutes at 165° C. This is expected because potassium acid phthalate is too weak a base to remove hydrogen fluoride from the copolymer. For o-phthalic acid, ionization constants are reported as $K_1 = 1.3 \times 10^{-3}$ and $K_2 = 3.9 \times 10^{-6}$ in "Handbook for Chemistry and Physics," 48th edition, p. D–91 (1967–1968), Chemical Rubber Co., Cleveland, Ohio.

Stock code 14 which contains potassium acetate is tightly cured after a press cure of 30 minutes at 165° C. After postcuring for 24 hours at 204° C., the elastomer is tightly cross-linked as shown by the low percent volume swell in acetone.

In Examples 10 through 15, the amount of the potassium salt is probably somewhat higher than desired. The equivalents of potassium per equivalent of phenolic groups in the curing agent, hydroquinone, is in the range 1.1 to 1.5; whereas, it now is found that it may be possible to use as little as 0.17 to 0.80 equivalent potassium per equivalent of phenolic group; the range of 0.2 to 0.5 is probably preferred.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:
1. The vulcanization of saturated, fluorinated elastomeric copolymers with a polyhydroxy aromatic nucleophile in a weakly basic system in the presence of about 0.1 to 20 parts of an accelerator, per 100 parts of polymer, of the formula

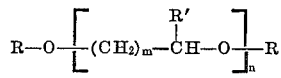

wherein R is hydrogen or $C_1$ to $C_4$ alkyl, $m$ is from 1 to 3, R' is hydrogen or methyl, and $n$ is an integer sufficient to give a molecular weight of at least about 150.

2. The process as defined in claim 1 wherein said polymer is a copolymer of vinylidene fluoride and hexafluoropropene.

3. The process as defined in claim 1 wherein said polymer is a copolymer of vinylidene fluoride, hexafluoropropene and tetrafluorethylene.

4. The process as defined in claim 1 wherein said accelerator is a polyethylene ether glycol wherein one R is hydrogen, the other R is hydrogen or methyl, the R' group is hydrogen, and $m$ is 1.

5. The process as defined in claim 1 wherein about 1 to 20 parts of MgO or Mg(OH)$_2$ are present.

6. The process as defined in claim 1 wherein said nucleophile is a bisphenol compound.

7. The process as defined in claim 6 wherein said bisphenol compound is an alkali metal or alkaline earth metal salt.

8. A saturated, fluorinated elastomeric copolymer for vulcanization with a polyhydroxy aromatic nucleophile in a weakly basic system, said polymer containing 0.1 to 20 parts of an accelerator, per 100 parts of polymer, of the formula

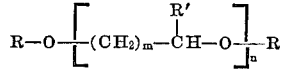

| Ingredients | Parts | | | | |
|---|---|---|---|---|---|
| | 11 | 12 | 13 | 14 | 15 |
| Copolymer of Example 1 | 100 | 100 | 100 | 100 | 100 |
| MT carbon black | 30 | 30 | 30 | 30 | 30 |
| MgO | 4 | 4 | 4 | 4 | 4 |
| Accelerator of Example 1 | 2 | 2 | 2 | 2 | 2 |
| Magnesium fluoride | 5 | 5 | 5 | 5 | 5 |
| Hydroquinone | 0.75 | 0.75 | 0.75 | 0.75 | 0.75 |
| Potassium stearate | 6 | | | | |
| Lithium benzoate | | 2.5 | | | |
| Potassium acid phthalate | | | 4 | | |
| Potassium acetate | | | | 2 | |
| Cesium benzoate | | | | | 4 |
| After press cure:[1] | | | | | |
| Shore hardness | 76 | | | 78 | 77 |
| Modulus, 100% elong | 780 | 400 | ([2]) | 950 | 1,000 |
| Tensile strength, p.s.i | 1,500 | 1,900 | ([2]) | 1,500 | 1,300 |
| Percent elong. at break | 180 | 440 | | 145 | 125 |
| Comp. set, 70 hr., 25° C | 22 | | | 26 | 36 |
| Comp. set, 70 hr., 121° C | 21 | | | 28 | 42 |
| Comp. set, 70 hr., 204° C | 66 | | | 69 | 94 |
| Percent volume swell in acetone, 8 days | 222 | 365 | | 251 | 182 |

[1] 30 min., 165° C., and oven postcure 24 hours at 204° C.
[2] Not cured.

wherein R is hydrogen or $C_1$ to $C_4$ alkyl, $m$ is from 1 to 3, R' is hydrogen or methyl, and $n$ is an integer sufficient to give a molecular weight of at least about 150.

9. Polymer as defined in claim 8 wherein said polymer is a copolymer of vinylidene fluoride and hexafluoropropene.

10. Polymer as defined in claim 8 wherein said polymer is a copolymer of vinylidene fluoride, hexafluoropropene and tetrafluoroethylene.

11. Polymer as defined in claim 8 wherein said accelerator is a polyethylene ether glycol wherein one R is hydrogen, the other R is hydrogen or methyl, the R' group is hydrogen, and $m$ is 1.

References Cited

UNITED STATES PATENTS

| 3,023,187 | 2/1962 | Lo | 260—41 |
| 3,414,547 | 12/1968 | Thompson et al. | |

JOSEPH L. SCHOFER, Primary Examiner

S. M. LEVIN, Assistant Examiner

U.S. Cl. X.R.

260—45.7, 45.95, 87.7